United States Patent [19]

Daly et al.

[11] Patent Number: 4,953,198

[45] Date of Patent: Aug. 28, 1990

[54] PUBLIC CORDLESS TELEPHONE

[75] Inventors: John J. Daly, Freehold; James G. Evans, Colts Neck, both of N.J.

[73] Assignee: At&T Company, Murray Hill, N.J.

[21] Appl. No.: 376,459

[22] Filed: Jul. 5, 1989

[51] Int. Cl.$^5$ ........................................... H04M 11/00
[52] U.S. Cl. ........................................ 379/61; 379/63; 455/32; 455/34
[58] Field of Search ....................... 379/58, 61, 62, 63; 455/32, 34

[56] References Cited

U.S. PATENT DOCUMENTS

| | | | |
|---|---|---|---|
| 4,560,832 | 12/1985 | Bond et al. | 379/62 |
| 4,639,549 | 1/1987 | Hirayama et al. | 379/62 |
| 4,679,225 | 7/1987 | Higashiyama | 379/62 |
| 4,741,049 | 4/1988 | DeJager et al. | 455/32 |
| 4,876,710 | 10/1989 | Reed et al. | 379/58 |
| 4,878,238 | 10/1989 | Rash et al. | 379/62 |

*Primary Examiner*—Jin F. Ng
*Assistant Examiner*—Jhancy Augustus
*Attorney, Agent, or Firm*—Samuel R. Williamson

[57] ABSTRACT

A cordless telephone employed in a public telephone system provides mobility and service at reasonable cost to users of portable communications equipment. The system includes a plurality of base units which are accessible by a plurality of similarly configured cordless telephones. Each one of these base units is assigned and operates on one of multiple frequency channels and each one of the cordless telephones is capable of establishing a communications link with each one of these base units. Once a cordless telephone establishes communications with a base unit within its reception range, other cordless telephones within this reception range are precluded from establishing communications with this base unit or monitoring or otherwise interfering with communications between the cordless telephone and this base unit while the communications link is established therebetween.

18 Claims, 5 Drawing Sheets

PUBLIC CORDLESS TELEPHONE

BACKGROUND OF THE INVENTION

1. Technical Field

This invention relates to cordless telephones and more particularly to a cordless telephone arranged for deployment in a public telephone system.

2. Description of the Prior Art

Telephone communications in public areas has traditionally been limited to a person using a public telephone where he or she could make either charge calls, pay calls or credit card calls. The mobility of the user has thus been limited to the immediate surroundings of the public telephone, as determined by the length of the telephone handset cord. One alternative to this limited mobility in telephone or two-way voice communications is to utilize a portable cellular telephone. With such a telephone, the user is able to freely move about while engaging in voice communications with a called party. Cellular telephones and cellular telephone service are fairly expensive to date, however. Cellular telephones are designed to be employed in a system which requires, among other things, a considerable investment in switching gear for transferring calls. Because of costs considerations, therefore, portable cellular telephones are unattractive to many potential users of portable communications equipment.

Another alternative to the public telephone that provides mobility in two-way voice communications in public areas is the new Telepoint System that has been provided for use in Europe. This system employs time-division duplex transmissions between a portable telephone and a base unit for providing cordless telephone communications. Like the cellular telephone, this telephone and its associated system is costly due to system requirements and the necessary circuit complexity required in the telephone for operation in such a system.

While the foregoing systems provide mobility in two-way voice communications in public areas, it is desirable to have a cordless telephone suitable for operation in a system that is not unduly complicated or expensive to implement in order to provide both mobility and service at reasonable cost for users of portable communications equipment.

SUMMARY OF THE INVENTION

In accordance with the invention, there is provided a cordless telephone suitable for use in a public area for providing mobility and two-way voice as well as data communications. The cordless telephone is employed in a public telephone system that includes a plurality of base units accessible by a plurality of cordless telephone handset units. Each one of the cordless telephone handset units is capable of establishing communications with each one of the base units. Communications between a handset unit and a base unit is established by a user activating the handset unit which, in turn, interrogates each one of a plurality of predetermined channels. A channel may be, for example, either a frequency or time slot channel. Interference between base units is avoided since each one of the plurality of base units is assigned and operates on a selected one of these predetermined channels.

When the user of the handset unit desires to make a telephone call, the handset unit is activated and initializes its receiver and transmitter on a selected first one of the predetermined channels for respective reception and transmission thereon. If the base unit assigned to operate on this selected first channel is then engaged with and communicating with another handset unit, this busy status of the base unit is detected and no transmission by the handset unit of the user attempting to establish communications is made on this channel. Rather, the handset unit increments to the next channel, determines if that channel is available and continues on in this manner until an available channel is located.

In accordance with a feature of the invention, once the handset unit selects an available channel within the reception range of a base unit operating on this channel, it transmits an identification code to the base unit over this channel. This identification code is unique to each handset unit and identifies a specific handset unit as the one attempting to establish communications with the base unit. The base unit receives the identification code, stores it in local memory and also transmits it back to the handset unit. The handset unit receives this code from the base unit and compares it with the code that it transmitted. If a favorable comparison of the identification code transmitted by the handset unit and the identification code received from the base unit is obtained, communications is established between the handset unit and the base unit on that selected channel. Once such a communications link is established, other cordless telephone handset units are precluded from establishing communications with a base unit already engaged by a handset unit even if a handset unit erroneously determines that an occupied channel is idle and transmits its identification code.

In accordance with another illustrative feature of the invention, limiting communications in the telephone system to the identified handset unit and the selected base unit is achieved through use of a message signaling format employed by both units in transmissions therebetween. A message signaling format for transmissions between the base unit and the handset unit is provided, for example, in the form of frequency shift keying (FSK) signals and includes a data field. This data field may be in the form of either command opcode data or dial-digit data, thereby allowing for the appropriate commands or functions. The identification code initially transmitted to the base unit by the handset unit for establishing communications is also included in the message format as part of the data field which defines specific commands or functions for execution by the base unit. Thus when a channel is in use, only that handset unit that has the same identification code that is then being recognized by the base unit may communicate with the base unit. If the handset unit user terminates the call by going "on hook" or goes out of range of the base unit, the connection is dropped so that no other handset unit can intercept the connection and fraudulently use that established communications channel. Moreover, when a user is inputting a telephone number including his charge card number into the handset unit, the base station generates the touch-tones for a charge card number input. The handset unit sends only coded signals when the buttons thereon are pushed so that someone with a radio receiver can not easily intercept the charge card number.

BRIEF DESCRIPTION OF THE DRAWING

The invention and its mode of operation will be more clearly understood from the following detailed description when read with the appended drawing in which.

Throughout the drawings, the same elements when shown in more than one figure are designated by the same reference numerals.

DETAILED DESCRIPTION

Figure 1:
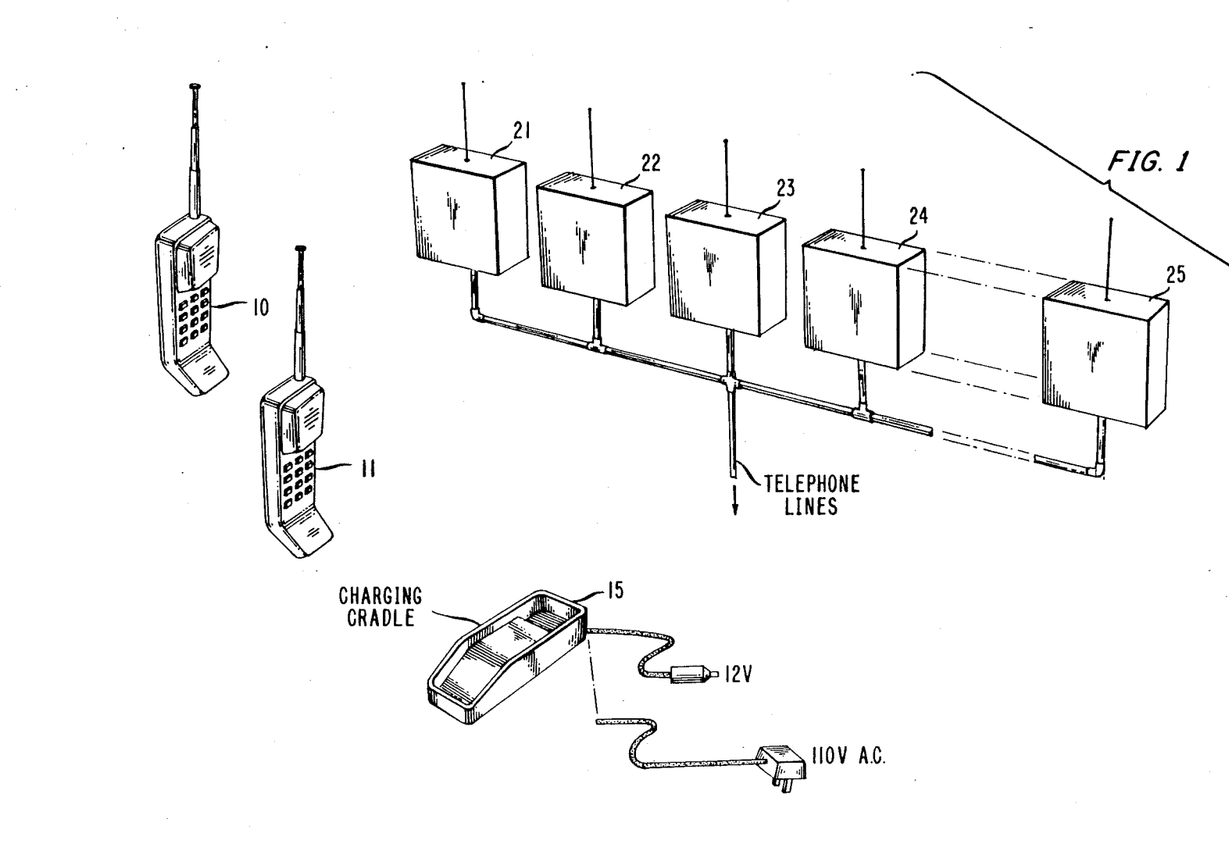
FIG. 1 depicts multiple handset units, a charging cradle for the handset units and multiple base units operative in accordance with the invention.

Referring now to FIG. 1 of the drawing, there is shown similar multiple cordless telephone handset units 10 and 11 and a charging cradle 15 for nesting either of these units and charging a battery therein. The charging cradle is operable in obtaining power, for example, either from a 12 volt DC power source such as is available in an automobile or from an 110 volt AC power source. Also shown are multiple public cordless telephone base units 21 through 25, each base unit transmitting and receiving on, for example, a separate predetermined duplex frequency channel and having its own assigned telephone tip-ring line. In operation, a user within the coverage area of at least one of the base units 21 through 25 requests service by pushing an activation button on the handset unit 10. A receiver in handset unit 10 first listens for a carrier signal on a first frequency channel, designated as channel one. If a carrier is detected at a level above a certain minimum threshold, this is an indication that this frequency channel is already busy communicating with another handset unit. If no carrier signal is detected, the handset unit then generates a request-for-service signal on channel one which is assigned to, for example, base unit 21. If there is no answer from this base unit within a predetermined time period, which could result if the handset unit is out of the reception range of the base unit or the base unit is out of service, the handset unit automatically switches to channel two which corresponds to, say, base unit 22. If this channel is not busy, the handset unit then signals on this channel. The handset unit continues to interrogate and signal in this manner until it finds an available frequency channel and establishes a communications link with a base unit on that channel or unsuccessfully interrogates each of the available channels.

Figure 2:
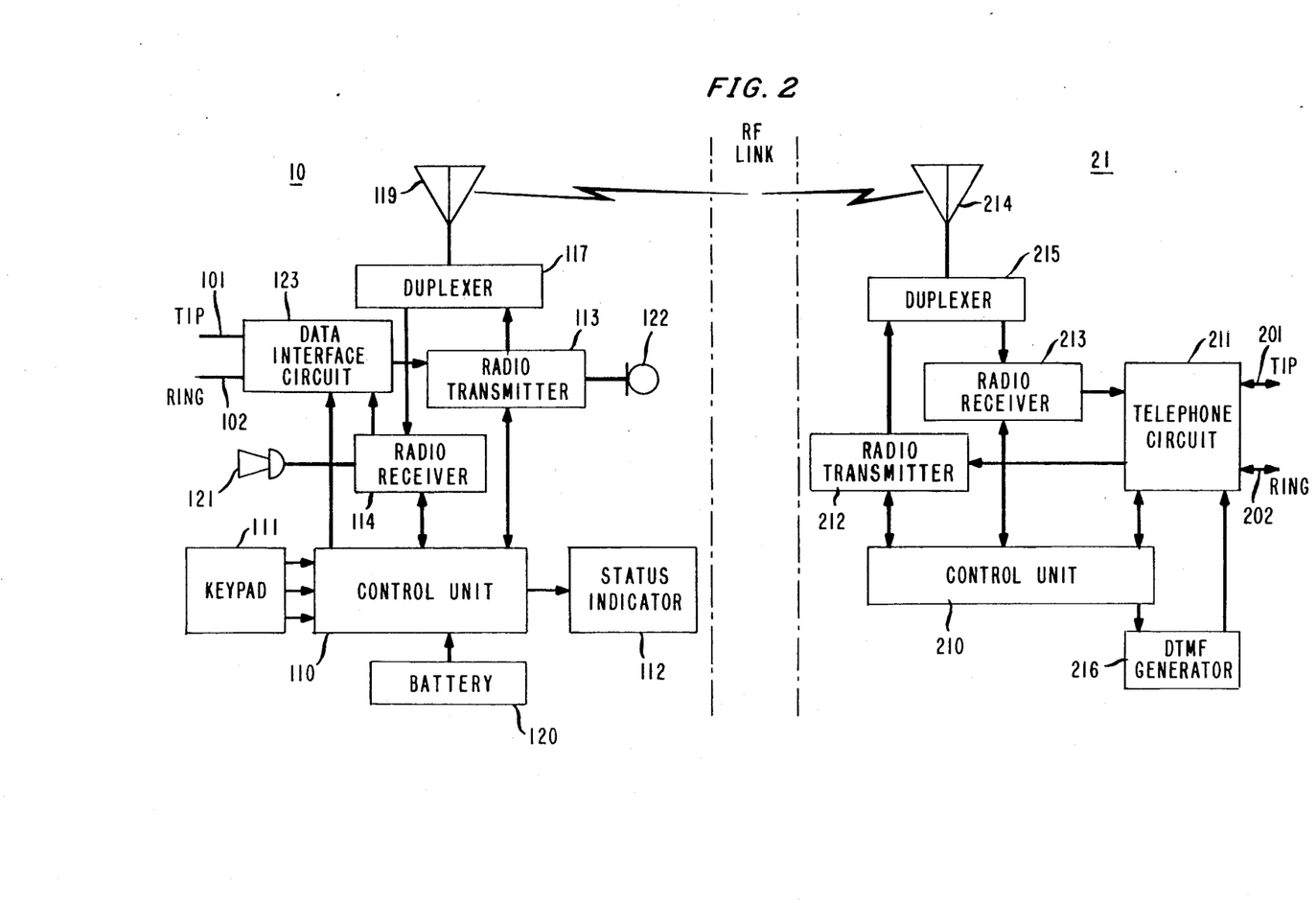
FIG. 2 is a block representation of the major functional components of one of the handset units and one of the base units depicted in FIG. 1 operative in accordance with the invention.

Referring next to FIG. 2 there is shown a functional block representation of a public cordless telephone system operative in accordance with the principles of the invention. As shown, the public cordless telephone system generally comprises at least one handset unit 10 and at least one base unit 21. Included in the handset unit 10 is a control unit 110 which advantageously provides a number of control functions. This control unit 110 may be implemented through the use of a microcomputer containing read-only-memory (ROM), random-access-memory (RAM) and through use of the proper coding. Such a microcomputer is known in the art and is readily available from semiconductor manufacturers such as Fujitsu, Motorola and NEC.

The control unit 110 generates an identification code that is transmitted from the handset unit 10 to the base unit 21 while establishing initial communications as well as during the transfer of subsequent opcode data to the base unit. This control unit 110 also configures a radio frequency (RF) transmitter 113 and a RF receiver 114 for operation on each of the plurality of predetermined frequency channels for communicating with a selected one of the plurality of base units operating on the selected predetermined frequency channel. The transmitter 113 and the receiver 114 respectively transmits signals to and receives signals from the base unit 21 with the control unit 110 providing the appropriate frequency channel control information to both units. The transmit and receive signals of the handset unit 10 are coupled to a duplexer 117 which permits the transmitter 113 and the receiver 114 to both simultaneously operate over antenna 119 while preventing the output of transmitter 113 from being coupled directly to the input of the receiver 114. The receiver 114 also demodulates voice signals transmitted by the base unit 21 and couples these signals to a loudspeaker 121. The transmitter 113 has as its input speech signals from a microphone 122 which it transmits to the base unit 21.

By way of operation, the receiver 114 is initially configured for sequentially interrogating and detectng an available frequency channel for communicating with one of the plurality of base units, such as base unit 21. When an available frequency channel is detected, the channel information is provided to the control unit 110 from the receiver 114. The control unit 110 processes the appropriate channel selection and identification code data selected for use in the handset unit 10 and generates a request-for-service signal which is transmitted by transmitter 113 over the available frequency channel. This request-for-service signal comprises a frequency shift keying (FSK) signal and includes a synchronizing signal immediately followed by a data field which contains the identification code generated by the control unit 110.

A battery 120 is included in the handset unit 10 and provides operating power for all circuitry in this unit. Also included in the handset unit is a key pad 111, a handset unit status indicator 112 and a data interface circuit 123. The key pad 111 is used for entering dial digits or control functions executed by the control unit 110 in the handset unit. The handset unit status indicator 112 contains, for example, light emitting diodes (LEDs) suitably arranged for providing the desired status indications. This status indicator 112 is connected to the control unit 110 and provides an indication to the user of the handset unit when (1) a communications link has been established between the handset unit 10 and the base unit 21, (2) a communications link can not be established due to all base units being busy, and (3) a communications link can not be established due to the handset unit being outside of the reception range of a base unit. A battery status indication reflective of the charge on the battery 120 is also provided by this status indicator 112. The data interface circuit 123 contains a hybrid and associated circuitry for providing a suitable port on tip and ring lines 101 and 102 for a modem or other data communications device.

Contained in the base unit 21 is a contrl unit 210 which interfaces with control unit 110 in the handset unit for receiving the appropriate identification code data and for establishing a two-way communications link between the handset unit and the base unit. This control unit 210 also receives and processes opcode data provided by the handset unit 10 in dialing and providing tone signaling information out to a central office via telephone circuit 211 and tip-ring lines 201 and 202. The telephone circuit 211 serves as a plain old telephone service (POTS) interface for signals on the tip-ring lines and those received by receiver 213 and those transmitted by transmitter 212. Responsive to the control unit 210, a dual-tone-multiple-frequency generator 216 provides the frequency tones to the telephone circuit 211. The tip-ring lines 201 and 202 are preferably connected to a charge-a-call line which is provided with call screening, call blocking, call rating, and fraud protection through the telephone company's traffic service position system (TSPS) facilities for noncommercial credit card calls and through the telephone company's call processor for commercial credit card calls. The tip-ring lines 201 and 202 may also be connected to the central office via a measured business service line (1MB). In this arrangement, call screening, call blocking, call rating, and fraud protection are provided through the respective base units. A method for providing this type of protection for a telephone connected to a 1MB line is disclosed in U.S. Pat. No. 4,782,516 issued to R. L. Maybach on Nov. 1, 1988.

The control unit 210 stores in memory located therein the appropriate identification code provided by the control unit 110 contained in the handset unit 10 and transmits this code via FSK signals back to the control unit 110. Communications with the selected handset unit are provided via transmitter 212 and receiver 213 in the base unit. The output of the transmitter 212 and input for the receiver 213 is coupled to an antenna 214 through a duplexer 215.

Figure 3:
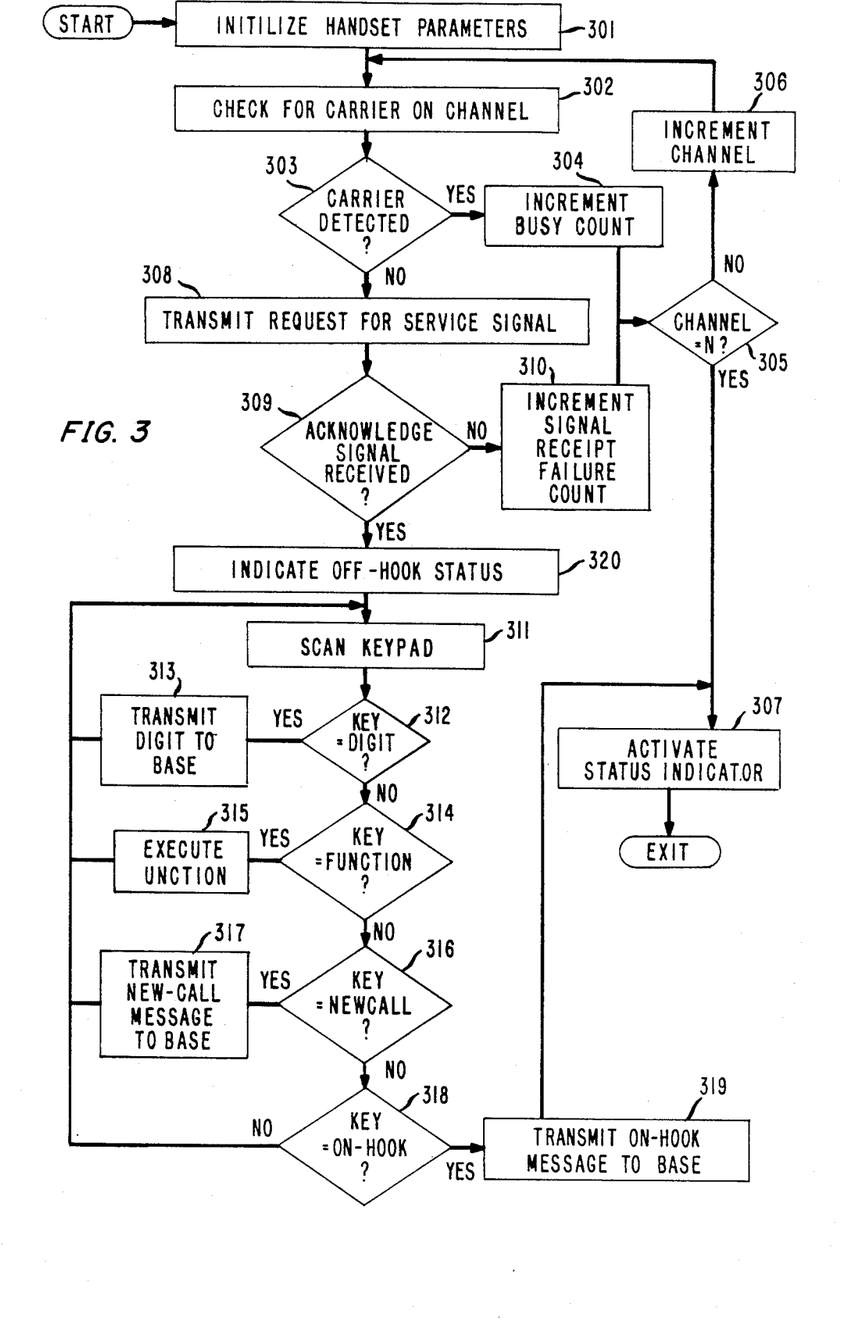
FIG. 3 depicts a flow chart illustrating the operation of the handset unit of FIG. 2.

Referring next to FIG. 3 there is shown a flow chart illustrating the operation of the handset unit 10 operating in a public cordless telephone system with the desired functionality. The functions in this flow chart are advantageously provided by a process or program stored in ROM contained in control unit 110.

The process is entered in step 301 where the initializing parameters are set. These include generating an identification code which comprises a randomly generated number having a sufficiently large number of digits (over 64 thousand different codes) so that other cordless telephones within the same reception area are highly unlikely to have this same number generated for use as an identification code. As part of the initializing step, the handset unit receiver is set on a first one of the predetermined frequency channels. These channels number between one and "N" and are limited only by the available number of allocated frequency channels allowed for this use. In the United States, for example, there are presently 10 duplex frequency channels available for use with cordless telephones. It is to be understood, however, that "N" could be any reasonable number less than or considerably greater than 10. A busy counter and a signal receipt failure counter are also both set at zero as part of the initializing step.

The process next advances to step 302 where the receiver 114 is set to the first frequency channel and listens for a carrier on this channel. It then advances to decision 303. If a carrier is detected at decision 303, the process advances to the increment-busy-count step 304 where a counter is advanced one unit toward and up to the number "N". From this step, the process advances to decision 305 where a determination is made as to whether the channel being interrogated is "N", or the last one of the predetermined frequency channels. If the channel being interrogated is not the last different channel that can be, the process advances to the increment channel step 306 wherein the next one of the predetermined frequency channels is selected. From this step, the process returns to step 302 where a check is made for carrier on this new channel and continues in this routine in the manner described above.

If at decision 305, it is determined that the channel just interrogated was the last one available among the predetermined frequency channels and that a carrier was detected on all of the interrogated channels, the process then advances to step 307, where a status indicator on the handset unit is activated providing an indication that all the interrogated channels are busy. From step 307, the process is exited.

Referring once again to decision 303, if a carrier on the selected frequency channel is not detected, the process advances to step 308 where a request-for-service signal is transmitted by the handset unit on the selected frequency channel. This signal includes a synchronizing signal and the identification code then selected by the handset unit. The process next advances to decision 309 where it is determined if an acknowledge signal has been received by the handset unit receiver from a base unit. Such a signal from a base unit must include the samme identificatin code initially transmitted by the handset unit. Otherwise, the handset unit will not respond to the acknowledge signal. If the acknowledge signal is not received in a predetermined time period, the process advances to step 310 where a signal receipt failure counter is advanced one count toward and up to the number "N".

From step 310, the process advances to decision 305 where a determination is made as to whether the channel being interrogated is "N" or the last one of the predetermined frequency channels. If this is not the last different channel, the process advances to the increment channel step 306 wherein the next one of the predetermined frequency channels is selected and interrogated. If it is determined that the channel interrogated was the last one available among the predetermined frequency channels, however, and that no signal was received for all the interrogated channels, the process advances to step 307 where the status indicator provides the indication that a communications link between the handset unit and a base unit cannot be established because the handset unit is outside of the reception range of a base unit. From step 307 the process is exited.

This status indicator reflected in step 307 is multifold in functionality and provides an indication not only that all channels are busy, when appropriate, but also provides an indication that a communications link between the handset unit and a base unit cannot then be established because the handset unit is outside of the reception range of a base unit. It is anticipated that in certain electromagnetic environments the handset unit could be within the reception range of some base units which are busy and outside the reception range of other base units. Or these other base units, assigned to frequency channels which the handset unit interrogates, may not be in service at the time of the interrogation. For this set of conditions, the process is also exited, with the user knowing that he or she is within the reception range of some base stations which then happen to be busy.

If the appropriate acknowledge signal is received at decision 309, a communications link between the handset unit and the base unit is estabilished with the base unit providing dial tone to the handset unit and the handset unit, in turn, providing in step 320 an off-hook indication to the handset user so that he or she knows that communications has been established with the base unit.

Once the communications link is established between the handset unit and a base unit, the process advances to step 311, the first step in a series of steps wherein the user requests are processed. In step 311, the keypad is scanned for the entry of a digit. In decision 312, any digit entered on the keypad is detected and this digit transmitted to the base unit as reflected by step 313. The information transmitted to the base unit in this step, as well as other steps in this part of the routine, is provided in the form of an opcode message and contains the handset unit identification code and data represetnative of the digit entered on the keypad.

If the entry of a digit is not detected on the keypad in decision 312, the process advances to decision 314 which monitors the activation of function keys. Function keys provide local enhancements and convenience to the handset unit. One such function key transmits the handset unit owner's calling card number to the base unit upon request. Security is maintained, however, in that before the calling card number is transmitted, the handset unit requires its user to provide a security access number consisting of, for example, four digits. And the user is allowed a prescribed number of attempts, such as eight, to enter these digits correctly. Once a user has called up this function and entered an incorrect access number more than the prescribed number of times, the calling card number is erased. This information in the handset unit may be restored only through reprogramming. The calling card number of the owner of the handset unit is thus protected if he or she loses or misplaces the handset unit.

If the depression of a function key is not detected by decision 314, the process advances to decision 316 which looks for a depression of the new call key, which may be, for example, the "#" key. Depressing this key allows sequence calling and indicates that the user of the handset unit wishes to terminate the existing call and make a new call. If the new call key is depressed the process advances to step 317 and transmits the appropriate opcode message to the base unit. If the new call key is not depressed, the process advances to decision 318 which looks for a depression of the on-hook key reflecting that the user desires to terminate the existing call. If this on-hook key has not been depressed, the process returns to step 311 and repeats this routine. If this on-hook key has been depressed, however, the process advances to step 319 where the appropriate opcode message is transmitted to the base unit, thereby releasing it from this handset unit. Next the process advances to the status indicator step 307 where an on-hook indication is provided to the user of the handset unit. The process is then exited.

Figure 4:
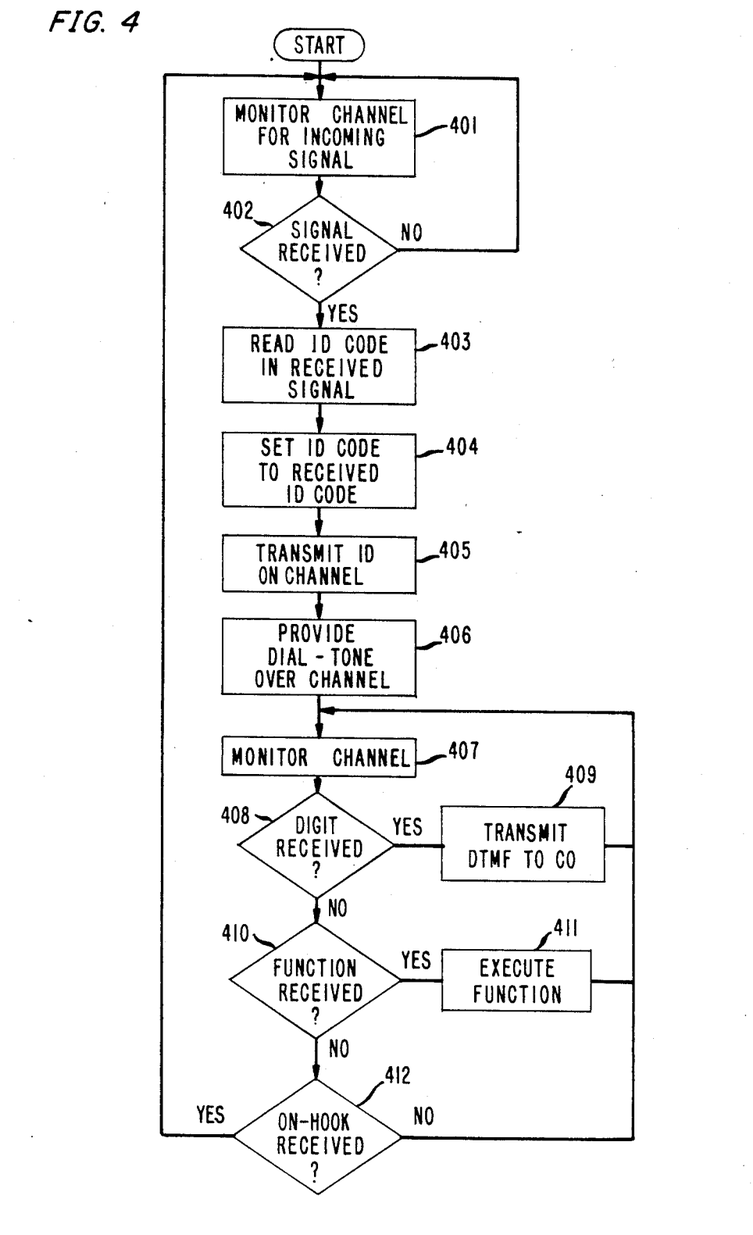
FIG. 4 depicts a flow chart illustrating the operation of the base unit of FIG. 2.

Referring next to FIG. 4 there is shown a flow chart illustrating the operation of the base unit 21 operating in a public cordless telephone system with the desired functionality. The functions in this flow chart are advantageously provided by a process or program stored in ROM contained in control unit 210.

The process is entered in step 401 where a selected frequency channel is monitored by the base unit for receipt of a request-for-service signal from a handset unit. The process next advances to decision 402 where receipt of a request-for-service signal is determined. If a request-for-service signal has not been received, the process returns to step 401. If a request-for-service signal is received, as determined by the decision 402, the process advances to step 403 where the identification code in the request-for-service signal is read and then to step 404 where it is stored in memory in the base unit as the identification code for that base unit. This identification code is then transmitted on the frequency channel in step 405 back to the handset unit requesting service. With the successful completion of these steps, the base unit is seized by the handset unit and operates as a dedicated base unit in step 406 providing dial tone to the handset ubnit and establishing a communications path over the frequency channel.

Most communications with the handset unit by the base unit is in the form of opcode messages and includes the common identification code then shared by the base unit and the handset unit. As the base unit ignores any inadvertent message signals on its frequency channel that do not include the identification code associated with the handset unit, in the same manner, the handset unit ignores any inadvert message signals on the frequency channel that do not have its identification code.

Once the communications link has been established, the process advances to step 407 where it monitors the frequency channel for receipt of a digit. In decision 408, any digit received from the assigned handset unit over the frequency channel by the base unit is detected and in step 409 this digit is translated to a dual-tone-multiple-frequency signal and transmitted to the central office.

If the receipt of a digit over the frequency channel is not detected in decision 408, the process advances to decision 410 which monitors the receipt of function requests provided over the frequency channel. If a function request is received, the process advances to step 411 where the function request if executed. By way of illustration of a function request, one opcode message from the handset unit to the base unit is to terminate an existing call and begin a new call. Thus upon receipt of this request, the base unit terminates the existing call and provides dial tone to the handset unit. The process then returns to the routine at step 407. If a function request is not received at step 410, the process advances to decision 412 which looks for an on-hook opcode message reflecting that the user desires to terminate the call. If this opcode message is not received, the process returns to step 407 and repeats this routine. If this opcode message is received, however, the the base unit is released and the process returns to step 401 where the base unit once again begins to monitor the frequency channel for a request-for-service signal from any one of multiple handset units.

Cordless telephones generally intended for use the home are available in the marketplace. An example of the technology inculded in such telephones is disclosed in U.S. Pat. No. 4,736,404 issued to R. E. Anglikowski, et al. on Apr. 5, 1988 and U.S. Pat. No. 4,731,814 issued to W. R. Becker, et al., on Mar. 15, 1988. Although the present invention discloses technology in the form of a specific embodiment for achieving cordless telephone communication in a public area, it is understood that various modifications and combinations of these technologies are possible within the spirit and scope of the invention.

The control unit in the public cordless telephone handset unit, for example, may be arranged so that it is alternatively configurable such that operation either with a single base unit in a home or with multiple base units in a public area is permitted. In such an implementation, the handset unit incorporates the technology disclosed in the above noted patents for operation in the home and the embodiment described herein above for operation in a public area.

In an alternative implementation of the public cordless telephone system, the control units both in the cordless telephone handset unit and the base unit may be configured such that the base unit interrogates all of the frequency channels in search of a request-for-service signal which is provided on a specific frequency channel by select ones of multiple handset units. Or, alternatively, the base units and handset unit may be arranged such that both have the capability to scan the frequency channels and switch to an available one of these channels. By way of illustration, if a base unit is not busy, its control unit would direct it to monitor an available channel, a preferred channel if multiple channels are available, since this channel is one that a handset unit seeking an available channel would also monitor before sending a request-for-service signal.

Figure 5:
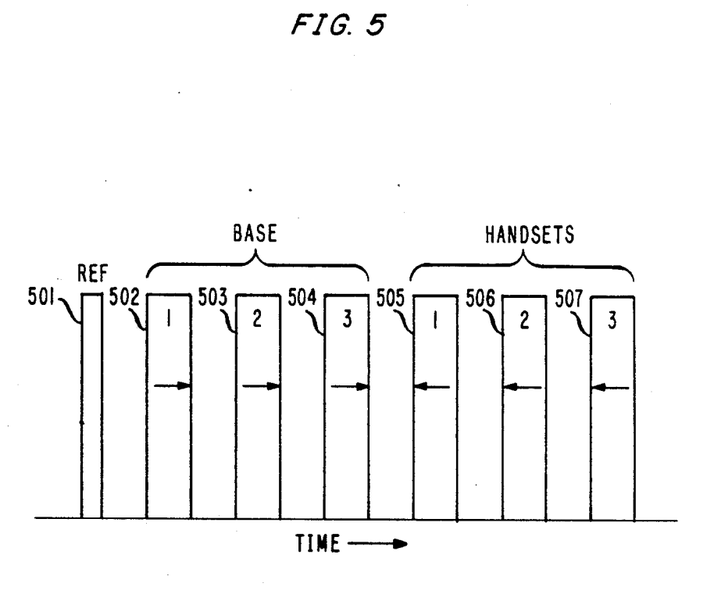
FIG. 5 depicts a time division multiple access arrangement wherein a handset unit communicates with a base unit in accordance with the invention.

In another alternative implementation of the public cordless telephone system, communications between the base units and the handset units may be provided by time division multiple access (TDMA) channels. In this implementation and with reference to FIG. 5, there is provided a reference or start pulse 501 and, illustratively, three time slots 502, 503 and 504 containing data provided by a base unit and three time slots 505, 506 and 507 containing data provided by multiple handset units. Time slots 502 through 504 are respectively associated with time slots 505 through 507 such that a time slot used by the base unit and a time slot used by one of the handset units comprise a channel. By way of exampole, the base unit communicating with a handset unit on the channel designated as channel "one" transmits information to that handset unit in time slot 502 and receives information from that handset unit in time slot 505. In establishing initial communications, the handset unit finds and available channel and transmits to the base unit on this channel. The base unit then responds on this channel and a communications link is established. In this implementation, one base unit may advantageously communicate with multiple handset units by providing data for each handset unit on the appropriate channel. It is therefore to be understood that within the scope of the appended claims, the invention may be practiced otherwise than as specifically described.

We claim:

1. A cordless telephone arrangement for operation in a public telephone system, the arrangement including a plurality of base units and a plurality of remote units, each base unit being activatable by each remote unit for requesting service therefrom, the arrangement comprising:

means for adapting each one of the plurality of base units for operation on separate selected ones of a plurality of radio frequency channels;

means located in each remote unit for interrogating each of the plurality of channels for detecting an available channel and for transmitting an unique randomly generated identification code for establishing communications with a base unit operating on the available channel, the identification code being transmitted over the available channel by a remote unit to the base unit for identifying said remote unit as requesting service; and activation means in the base unit responsive to the receipt of the identification code for establishing communications between the base unit and the remote unit requesting service.

2. The cordless telephone arrangement as in claim 1 wherein the identification code received by the base unit over the available channel is subsequently transmitted over the available channel by the base unit for indicating receipt of said code.

3. The cordless telephone arrangement as in claim 1 wherein the available channel is seized by the remote unit as a dedicated channel for dedicated communications between the remote unit and the base unit.

4. The cordless telephone arrangement as in claim 3 further including means for storing the identification code received by the base unit over the dedicated channel in memory in the base unit, this code being incorporated in each data transmission response provided over the dedicated channel by the base unit.

5. The cordless telephone arrangement as in claim 4 wherein the base unit is unresponsive to all communication attempts unaccompanied by the identification code over the dedicated channel and the remote unit is unresponsive to all communication attempts unaccompanied by the identification code over the dedicated channel.

6. A method of communicating in a public telephone system having a plurality of base units and a plurality of remote units, each base unit being activatable by each remote unit for requesting service therefrom, the method comprising the steps of:

adapting each one of the plurality of base units for operation on separate selected ones of a plurality of radio frequency channels;

interrogating each of the plurality of channels by each remote unit for detecting an available channel;

transmitting from each remote unit an unique randomly generated identification code over the available channel for establishing communications with a base unit operating on the available channel, the identification code identifying a particular remote unit requesting service; and establishing communicatins between the base unit and the remote unit requesting service in response to the receipt of the identification code by the base unit from the remote unit.

7. The method of communicating in a public telephone system as in claim 6 further comprising the step of transmitting the received identification code by the base unit over the available channel for indicating receipt of said code.

8. The method of communicating in a public telephone system as in claim 6 further comprising the step of seizing the available channel by the remote unit, the seized channel being used for dedicated communications between the remote unit and the base unit.

9. The method of communicating in a public telephone system as in claim 8 further comprising the step of storing in memory in the base unit the identification code received by the base unit over the dedicated channel, this code being incorporated in each data transmission response provided over the dedicated channel by the base unit.

10. The method of communicating in a public telephone system as in claim 9 wherein the base unit in unresponsive to all communication attempts unaccompanied by the identification code over the dedicated channel and the remote unit is unresponsive to all communication attempts unaccompanied by the identification code over the dedicated channel.

11. A cordless telephone remote unit for operation in a public telephone system, the system including a plurality of base units and a plurality of remote units, each base unit being adaptable for operation on a separate selectd one of a plurality of radio frequency channels and responsive to receipt of an identification code from a remote unit requesting service, the remote unit comprising:

means for interrogating each of the plurality of channels for detecting an available channel and for transmitting an unique randomly generated identification code for establishing communications with a base unit operating on the available channel; and means for seizing the available channel as a dedicated channel for dedicated communications between the remote unit and the base unit.

12. The cordless telephone remote unit as in claim 11 wherein the means for interrogating each of the plurality of channels comprises means for monitoring each channel for receipt of a carrier signal, a channel being unavailable when the carrier signal is detected and available in the absence of the carrier signal.

13. The cordless telephone remote unit as in claim 12 further comprising status indicator means responsive to the interrogating means for providing an indication when each of the plurality of interrogated channels is unavailable.

14. The cordless telephone remote unit as in claim 12 further comprising status indicator means for providing an indication when an available channel is detected in response to the interrogating means, and for providing an indication in response to the absence of communications from a base unit over the available channel after transmitting the identification code.

15. A method of communicating with a cordless telephone remote unit in a public telephone system, the system including a plurality of base units and a plurality of remote units, each base unit being adaptable for operation on a separate selected one of a plurality of ratio frequency channels and responsive to receipt of an identification code from a remote unit requesting service, the method comprising the steps of:

interrogating each of the plurality of channels for detecting an available channel;

transmitting an unique randomly generated identification code for establishing communications with a base unit operating on the available channel; and seizing the available channel as a dedicated channel for dedicated communications between the remote unit and the base unit.

16. The method of communicating with a cordless telephone remote unit as in claim 15 wherein the interrogating step further comprises the step of monitoring each channel for receipt of a carrier signal, a channel being unavailable when the carrier signal is detected and available in the absence of the carrier signal.

17. The method of communicating with a cordless telephone remote unit as in claim 16 further including the steps of providing an indication when an available channel is detected in response to the interrogating step, and providing an indication in response to the absence of communications from a base unit over the available channel after transmitting the identification code.

18. The method of communicating with a cordless telephone remote unit as in claim 17 further including the step of providing an indication when each of the plurality of interrogated channels is unavailable.

* * * * *